United States Patent [19]

Merensalmi

[11] 4,127,676
[45] Nov. 28, 1978

[54] FODDER ADDITIVE FOR RUMINANTS

[75] Inventor: Matti J. Merensalmi, Turku, Finland

[73] Assignee: Farmos-Yhtyma Oy, Finland

[21] Appl. No.: 778,359

[22] Filed: Mar. 17, 1977

[30] Foreign Application Priority Data

Mar. 19, 1976 [FI] Finland ................................. 760746

[51] Int. Cl.$^2$ .......................... A23K 1/00; A23K 1/02
[52] U.S. Cl. ...................................... 426/2; 426/635; 426/640; 426/807
[58] Field of Search .................... 426/635, 807, 2, 640, 426/636; 260/635 C

[56] References Cited

FOREIGN PATENT DOCUMENTS

| 600,707 | 6/1960 | Canada | 426/807 |
| 645,019 | 7/1962 | Canada | 260/635 C |
| 838,766 | 6/1960 | United Kingdom | 260/635 C |

*Primary Examiner*—Raymond N. Jones
*Assistant Examiner*—Elizabeth A. Hatcher
*Attorney, Agent, or Firm*—McGlew and Tuttle

[57] ABSTRACT

A fodder additive is provided for increasing the blood sugar of ruminants and their milk level. The fodder additive comprises as active agents at least one sugar alcohol having five or six hydroxyl groups, especially xylitol, arabitol and dulcitol. A preferred additive contains, based upon dry weight: 5–25% xylitol; 20–35% arabitol; 10–25% mannitol; 5–15% sorbitol; 5–10% dulcitol; 5–10% rhamnitol.

9 Claims, No Drawings

FODDER ADDITIVE FOR RUMINANTS

BACKGROUND AND OBJECT OF THE INVENTION

The object of the invention is a fodder additive for use in the feeding of ruminants, the additive influencing advantageously the milk production of cows by increasing their blood sugar level.

The metabolism of the organism requires easily soluble carbohydrates, above all various sugars, of which glucose is the most important. In the non ruminants the large molecular carbohydrates, such as starch, split into sugars by means of the digestive fluid in the intestine. In ruminants, the same splitting takes place already in the proventriculi, above all in the rumen, through the action of microbes. These carbohydrates as well as the sugars contained in the fodder are used as an energy source of the microbes and are thus converted into a microbial mass and consequently do not directly increase the sugar supply to the organism.

Animals, including ruminants, need sugar predominantly for the function of the liver and the mammary glands. Glucose is converted into lactose in the cow's udder and is secreted together with the milk. In a cow yielding 30 kg of mild daily this corresponds to about 1500 g of glucose leaving the organism daily. Taking into consideration the animal's further requirements it is estimated that a medium size cow in its period of maximum production requires about 2000 g/day of sugar. This sugar amount must be supplied by the liver. As no considerable amounts of sugar, especially glucose, pass through the rumen, intact glucose must be produced in the liver of the ruminants. Important glucose sources constitute propionic acid in the rumen and glucose synthesis by the organism from proteins and lactic acid. It is however estimated that the sugar deficit in an animal yielding 30 kg of milk daily is about 700 g. The animal attempts to compensate for this deficit by breaking down organism fats. By this means glycerol is formed which is converted into glucose. Also fatty acids are formed, which in turn break down into ketone-bodies. Thus, the animal might suffer from ketosis in case an excessive degradation of fats occurs.

If the supply of glucose to the animal is ensured, the breaking down of fat tissue decreases which, however, is not normally sufficient to maintain the glucose level in the blood.

The glucose level in the udder plays an essential role in the regulation of the mild yield. If the udder tissue contains large amounts of glucose, the cells will absorb fluid by osmosis from the blood to compensate the osmotic pressure. The milk yield thus increases. If the sugar content is low, the opposite phenomenon occurs.

THE PRIOR ART

As today's high yield ruminants are not always capable of ensuring their glucose need, auxiliary feeding means have been used. Ruminants have been administered glucogenic feeding additives which do not break down in the rumen, but pass intact therethrough to the later stomach compartments and from there on to the liver, where they are converted into sugars. It is also possible to try to increase the propionic acid content in the rumen as propionic acid is converted into active glucose in the liver. For this purpose it is known to use the following substances: propylene glycol, glycerol, various propionates, even propionic acid.

SUMMARY OF THE INVENTION

According to the invention it has now surprisingly been found that an additive to be incorporated into ruminant fodder and exhibiting a high sugar alcohol content, an advantageous composition of which is found in the mixture of various sugar alcohols obtained as a by-product in the production of xylitol from plant material, substantially improves the glucose balance of ruminants as it acts similarly to the above mentioned glucogenic substances. The characteristics of the additive appear in the appended claims.

An advantageous composition contains xylitol, arabitol, dulcitol and possibly rhamnitol.

DESCRIPTION OF EMBODIMENTS OF THE INVENTION

The product according to the invention is called a sugar alcohol mixture, one embodiment of which is obtained as a by-product of the xylitol production from birch. It is a yellowish brown sweet fluid exhibiting a specific weight of about 1.22 as a 50 percent aqueous solution at room temperature. Its energy (caloric) value and degree of sweetness are same as for glucose. A composition of the product in question was earlier approximately the following, calculated on a dry matter basis:

| | | |
|---|---|---|
| xylitol | 15–25 % | by weight |
| arabitol | 20–35 % | " |
| mannitol | 15–25 % | " |
| sorbitol | 5–15 % | " |
| dulcitol | 5–15 % | " |
| rhamnitol | 5–10 % | " |
| others | 2–5 % | " |
| break-down products | 2–5 % | " |

In more recent processes the recovery of xylitol has been improved and the composition may vary within the following limits:

| | | |
|---|---|---|
| xylitol | 6–18 % | by weight |
| arabitol | 9–21 % | " |
| mannitol | 13–19 % | " |
| sorbitol | 8–12 % | " |
| dulcitol | 5–11 % | " |
| rhamnitol | 4–6 % | " |
| reducing sugars | 8–15 % | " |
| other polyols | 6–14 % | |

It is known from literature that xylitol stimulates the liver functions and enhances the cell activity. It is also known that the microbes of the mouth are not able to utilize xylitol as an energy source. The present invention, however, is based upon the prior unknown fact that sugar alcohols remain intact also under the conditions in the rumen sufficiently long without breaking down, which appears from the test results presented in Example 1.

EXAMPLE 1

In Example 1 the breaking down of various single sugar alcohols in the rumen has been studied in vitro.

The preservation of sugar alcohols in the rumen fluid (% of the amount added)

| Incubation time | 2h | 4h | 8h | 24h | 48h |
|---|---|---|---|---|---|
| xylitol | 91.2 | 89.7 | 88.4 | 83.4 | 33.8 |
| arabitol | 86.8 | 93.0 | 88.3 | 87.0 | 55.9 |
| mannitol | 88.9 | 88.1 | 80.5 | 1.4 | 0.4 |

-continued

| Incubation time | 2h | 4h | 8h | 24h | 48h |
|---|---|---|---|---|---|
| dulcitol | 92.9 | 94.3 | 85.8 | 61.2 | 7.0 |
| sorbitol | 91.3 | 88.3 | 79.6 | 11.1 | 0.2 |

It is concluded that the sugar alcohols in question remain almost completely intact without being metabolized for 8 hours, xylitol, arabitol and dulcitol even for 24 hours and arabitol and xylitol partly even longer. Ordinary sugar breaks down in less than 2 hours.

EXAMPLE 2

This Example concerns the behaviour in the rumen fluid of a sugar alcohol mixture of the following composition calculated as dry matter

| | | |
|---|---|---|
| xylitol | 18 % | by weight |
| arabitol | 24 % | " |
| mannitol | 18 % | " |
| sorbitol | 9 % | " |
| galaxitol | 7 % | " |
| rhamnitol | 7 % | " |
| reducing sugars | 7 % | " |
| other polyols | 10 % | " | and it is concluded that its preservation is comparable to the preservation of the single sugar alcohols. Incubation time 2h 4h 8h 24h 48h % left of the amount added 92.6 86.7 87.6 55.2 23.7

As the flow of the fluid in the rumen is only a few hours, the sugar alcohol reaches the latter stomach compartments before any essential degradation in the rumen can occur.

After passing through the rumen the sugar alcohols act according to the normal sugar metabolism, which is evidenced i.a. as an increase in the blood glucose level as shown in Example 3.

EXAMPLE 3

Changes in the blood glucose level

| days after start of test | Test period | | | | | | | | |
|---|---|---|---|---|---|---|---|---|---|
| | 0 | 10 | 13 | 15 | 17 | 18 | 19 | 21 | 25 |
| | No sugar alcohol | | | | Sugar alcohol | | | | |
| | | | | | 2 × 125 g dry matter | | | 2 × 250 g dry matter | |
| glucose mmol/l | 3.4 | 3.1 | 3.0 | 2.5 | 2.7 | 3.1 | 3.2 | 3.2 | 3.5 |

During normal feeding the glucose level of the test animal decreased constantly, and was less than 3.0 mmol/1 already before starting the test feeding. The administration of 2 × 125 g dry matter of the sugar alcohol mixture according to Example 2 was begun on the 17th day of the test period. The blood glucose values showed an increase the very same day. After one week of test feeding the glucose value re-established its initial value at the beginning of the test period. The animal's general condition returned to normal, as judged externally.

The fat percentage in the milk of the test animal varied before administration of the sugar alcohol mixture by almost 2 percentage units daily, being at an average 4.5%. After starting the test feeding the fat percentage decreased within two days to the level specific for the animal in question, i.e. below 4.0%. Simultaneously the daily fluctuations became insignificant.

The energy and above all the sugar metabolism of the animal of Example 3 was disturbed to such a degree that ketose would have been imminent had not the test feeding been started and the sugar metabolism restored to normal.

By acting on the rumen functions by increasing the propionic acid production at the expense of acetic acid and butyric acid, the sugar metabolism of ruminants may be improved, as propionic acid is converted to extremely effective glucose in the organism.

Example 4 illustrates the effect of a sugar alcohol mixture on the fatty acid production of the rumen. An increase in the acetic acid content means an energy waste, as its further metabolization gives rise to carbon dioxide which leaves the organism unused. On the other hand, propionic acid is converted entirely into glucose.

EXAMPLE 4

Rumen specimens obtained with a fistula were investigated as to the changes in the acetic acid (E) and propionic acid (Pr) contents of the rumen fluid. During the pre-feeding stage the percentage of E showed an increase whereas that of Pr decreased. After starting the test feeding the ratio began to change into the opposite direction. Externally judged, the animal visibly improved.

| Test period | 1 | 2 | 3 | 4 | 5 | 6 |
|---|---|---|---|---|---|---|
| E % | 51 | 60 | 62 | 57 | 51 | 52 |
| Pr % | 28 | 26 | 25 | 27 | 28 | 29 |

Test stages 1 to 3 correspond to winter feeding with standard fodder, whereby symptoms of inbalance in the sugar metabolism were evident during feeding, at stage 4 the cow was fed a sugar alcohol mixture the composition of which corresponded to Example 2, in an amount of 2 × 125 g, at stage 5 the dose was 2 × 250 g and at stage 6 the dose was 2 × 200 g of sugar alcohols daily calculated as dry matter per animal.

It is concluded that the propionic acid formation by the rumen increased by more than 100 g daily as a result of the sugar alcohol mixture. The major part of the sugar alcohol mixture however passes through the rumen without breaking down.

EXAMPLE 5

A cow that had already passed its high-yeilding stage after calving was administered a solution containing sugar alcohols (c.f Example 2) at an amount of 0.4 liters daily. The composition of the solution was:

| | | |
|---|---|---|
| propylene glycol | 10 % | by weight |
| sodium propionate | 5 % | " |
| sugar alcohol mixture (50 % dry matter) | 40 % | " |
| molasses (60 % dry matter) | 45 % | " |
| | 100 % | (~ 65 % dry matter) |

The milk yield during the test feeding which lasted for about 4 weeks increased clearly, the increase being 0.1 kg daily. The test animal had already passed its peak yeild at the beginning of the test feeding, the energy requirement as glucose thus having already decreased from its maximum value. Depsite this the animal incrased its milk production. A similar test cannot be carried out during the early lactation, as it is not possible to say how much of the production increase is due to the normal increasing of the yield and how much is due to the fodder additive.

As a vehicle or fodder component for the additive mixture e.g. a by or waste product of a nutrient production process, such as molasses, is advantageously used. Into the mixture may also be incorporated glucogenic substances known per se, such as propylene glycol, whereby the amount of sugar alcohol mixture may be correspondingly reduced. The amount of sugar alcohol mixture is, however, always at least 10% by weight calculated on the dry matter of the mixture.

The additive mixture according to the invention may be used as a solution, whereby it may be packed in suitable containers and administered directly during feeding. The recommended dosage is 40 to 500 g of sugar alcohol daily calculated on the dry matter, per animal. The additive may also be dried and added e.g. to other industrial fodders, or used as such as dry bulk feeds.

I claim:

1. Method of increasing milk yield in a ruminant which comprises enriching fodder for said ruminant with an additive consisting essentially of a sugar alcohol having five or six hydroxyl groups to the fodder of the ruminant in an amount of at least 10% by weight calculated on the dry matter of fodder and feeding said enriched fodder to the ruminant in an amount sufficient to administer 40 to 500 grams daily of said sugar alcohols to said ruminant, whereby the milk yield from said ruminant is increased.

2. Method according to claim 1, wherein said additive contains a member selected from the group consisting of xylitol, arabitol, dulcitol and mixtures thereof.

3. Method according to claim 1, wherein the sugar alcohols comprise by-products obtained from the xylitol production from plant material.

4. Method according to claim 3, wherein the additive contains, calculated on the weight of dry matter, xylitol 5 to 25% arabitol 20 to 35%, mannitol 10 to 25%, sorbitol 5 to 15% dulcitol 5 to 10%, and rhamnitol 5 to 10%.

5. Method according to claim 1, wherein the fodder comprises a by-product from a nutrient production process, such as molasses.

6. Method according to claim 1, wherein said additive further contains a glucogenic substance.

7. Method according to claim 6, wherein said glucogenic substance is propylene glycol.

8. Method according to claim 1, wherein said additive is in the form of a solution.

9. Method according to claim 1, wherein said additive is in the dried form.

* * * * *